Patented Mar. 3, 1931

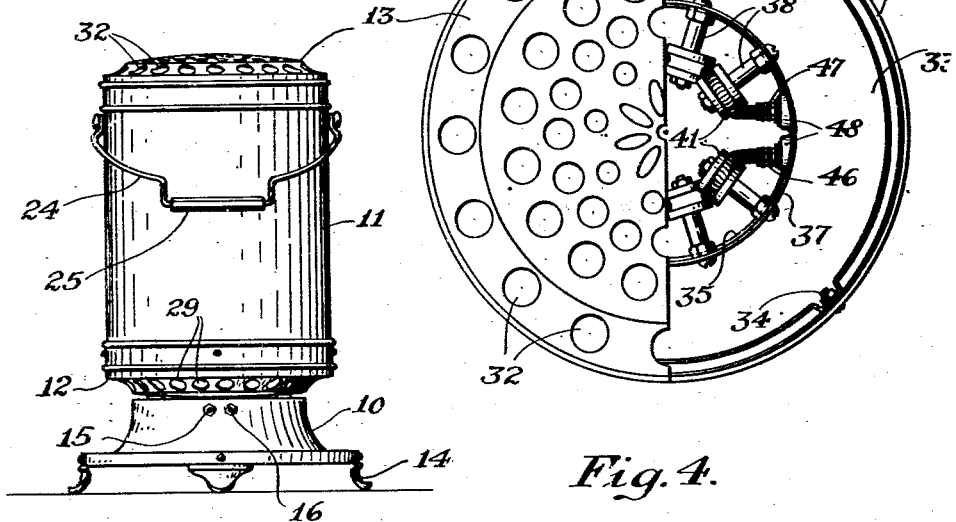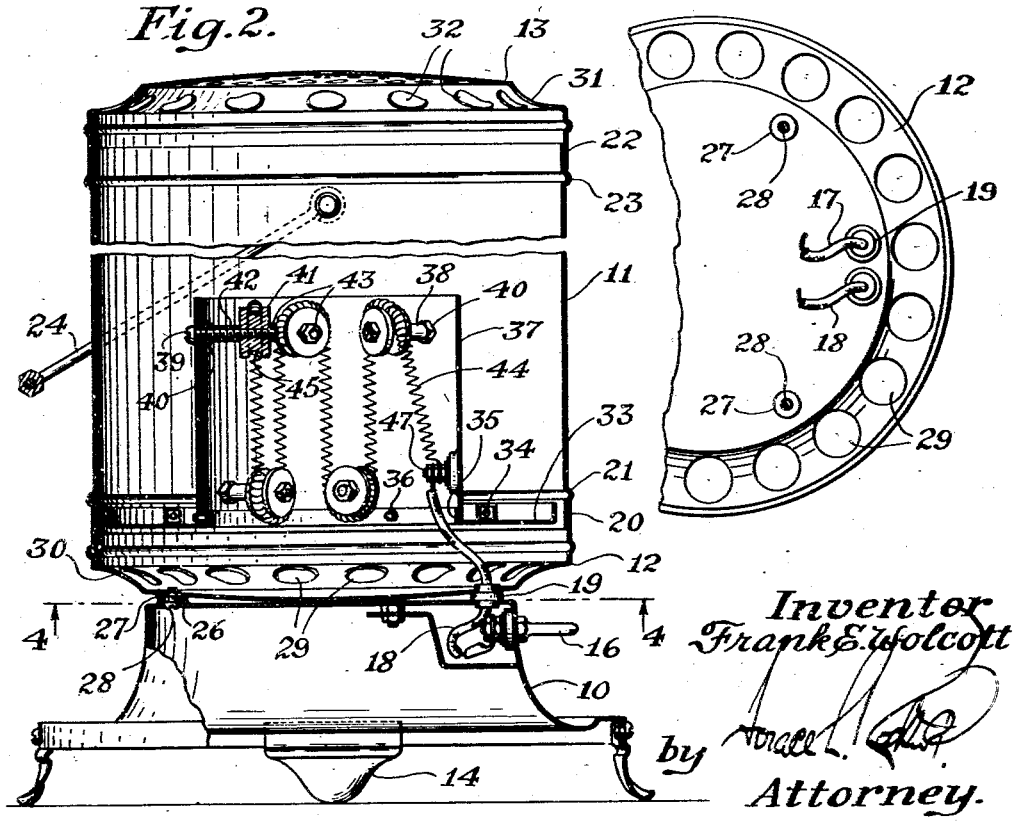

1,795,002

UNITED STATES PATENT OFFICE

FRANK E. WOLCOTT, OF WEST HARTFORD, CONNECTICUT, ASSIGNOR, BY MESNE ASSIGNMENTS, TO THE BEARDSLEY & WOLCOTT MFG. CO., A CORPORATION OF CONNECTICUT

ELECTRICAL HEATER

Application filed September 22, 1926. Serial No. 137,118.

This invention relates to heaters in which the heating element consists of an electrically energized resistance wire, and more particularly to an electrical heater of the socalled circulating type wherein cool air enters the device circulating about and over a heating element, and when heated passes out of the device and mingles with the surrounding atmosphere to raise the temperature thereof.

The principal object of this invention is to provide a heater of this type which will be economical to manufacture, and especially efficient in use.

Another object of this invention is to provide improved means in heaters of this type whereby the air currents will be permitted to enter at the bottom or lower portion, pass through and about the heating element and out at the top or upper portion.

Another object of this invention is to provide improved means for suspending the heating element within the device, and in such a manner that it will be in the direct path of the heating currents passing therethrough.

A further object of this invention is to provide a heater of this type wherein the structure is such that the heating element may be readily removed, and replaced in case of breakage or damage thereto, or interchanged with a similarly formed unit.

A still further object of this invention is to provide means within the device which will serve to reflect heat transversely across the air passage, and thus increase the heating effect of the heating element upon the air currents passing therethrough.

To these and other ends the invention consists in the novel features and combination of parts to be hereinafter described and claimed.

In the accompanying drawings:

Fig. 1 is an elevation of an electrical heater embodying the features of this invention.

Fig. 2 is an enlarged vertical section through the same.

Fig. 3 is a top plan view of the same, the cover being broken away to expose the interior of the casing, and shows the arrangements of the parts therein, and Fig. 4 is a bottom view of the same above the base looking in the direction of the arrows 4—4, in Fig. 2.

The device selected to illustrate the features of my invention, generally comprise the base 10, the casing 11, the casing bottom 12, and the cover 13. Base 10 is provided with suitable legs 14, by which it may be spaced from the floor or other object upon which the device is placed.

Suitable electrical connection plugs 15 and 16 are provided and secured to the base 10, from which flexible leads 17 and 18 extend into the casing 11 through a bushing 19.

The casing 11, is, in this instance, generally cylindrical in shape, and is supported upon the base 10 by telescoping within an upwardly directed flange 20 formed about the periphery of the dish-shaped bottom 12. An outwardly direct annular formed rib 21 in the casing limits the amount the casing enters the bottom 12. Casing 11 likewise telescopes within a downwardly directed flange 22 formed above the periphery of the inverted dish-shaped cover 13, and a similarly formed rib 23 formed in the casing, limits the amount it enters the same.

A bail 24 having a handle portion 25 is suitably secured to the casing adjacent its upper end, to provide means whereby the device may be transported to various locations as desired.

A series of struck-up lugs 26, in the upper face of the base 10 cooperate with similarly downwardly directed lugs 27, formed in the lower face of the bottom 12, to space the two parts from each other, and thus avoid undue transmission of heat therebetween. Securing means, such as bolts 28, pass through these lugs in an obvious manner to secure the two parts together.

The bottom 12 is provided with a series of openings 29 arranged about the same in the lower face, and adjacent to the peripheral edge thereof, to permit air to enter at the bottom of the device. The surface of the bottom wherein these openings are located, flares upwardly and outwardly to some extent, as at 30, to facilitate direction of the air currents into and towards the center of the casing 11.

The upper surface of the cover 13 is provided with a downwardly and outwardly flaring portion 31, in which is located a series of openings 32 which tend to direct passing air outwardly to cause it to spread. The remaining portion of the upper surface of the cover 13 is provided with a plurality of openings to permit the heated air to escape upwardly and outwardly from the casing 11.

A ring-shaped plate 33 is secured to the casing 11 adjacent the lower edge thereof, by means of fastening devices such as bolts 34; it being noted that the body of the ring is spaced from the casing 11 by air passages between the bolts, which not only reduce the conduction of heat to the bottom of the casing 11, but permit a small quantity of air to pass upward close to the walls of the casing to insulate the latter, thereby preventing injury from contact therewith or discoloration of the casing as the result of excessive heat.

The plate 33 is also provided with an upwardly directed flange 35 above the periphery of the opening in the center thereof, to which is secured by suitable means or bolts 36, a sleeve or shell 37. The sleeve or shell 37 is generally cylindrical in form and presents a constricted flue or passageway through which the air entering the openings 29 in the bottom 12 is caused to pass, the plate 33 acting as a baffle to direct the greater part of the air into the sleeve 37. Preferably the interior surface of the sleeve 37 is polished or otherwise brightened to provide an efficient reflecting surface. Attention is also directed to the spacing of this sleeve 37 from the casing 11, which further serves to prevent overheating of the latter.

A plurality of studs 38 are secured to the sleeve 37 and extend inwardly from the interior surface thereof. The studs 38, in this instance, each comprise a screw 39 which passes through the sleeve 37, and is held thereto by a nut 40. The screw 39 extends beyond the nut 40 and supports an insulator 41, which is illustrated as being in the form of a grooved spool, made preferably from porcelain, or other heat resisting material. A sleeve 42 spaces the spool 41 from the nut 40, and another nut 43 threaded on the end of the screw 39 retains the spool 41 thereon.

As illustrated, the studs 38 are positioned about the interior periphery of the sleeve 37 in a zigzag arrangement, one being adjacent the upper edge, and the next adjacent the lower edge. A coiled length of resistance wire 44 is wound or passed over the spools 41, being retained thereon in the grooves 45 thereof, the terminals of which are electrically and mechanically connected to terminal posts 46 and 47 respectively. The posts 46 and 47 are suitably secured to the sleeve 37 upon lugs 48 formed in the material thereof, and adjacent its lower edge. The leads 17 and 18 are connected to the posts 46 and 47 respectively so as to electrically connect the same with the terminal plugs 15 and 16.

When placed in operation by electrically connecting the plugs 15 and 16 to a source of electrical energy, the heating element comprising the length of resistance wire 44 becomes heated and immediately heats the same and within the air surrounding the same and within the sleeve 37. The heated air circulates upwardly through the sleeve 37, cool air being drawn in the openings 29 and also through the passages adjacent the bolts 34, and emerging through the openings provided in the cover 13. Here it will be noted that the air currents passing through the sleeve 37 encounter the hot wire 44 which is placed directly in the path thereof, passing over it and between and through the coils of the same during their upward movement. Attention is also directed to the fact that heat waves radiating from the interior surface of the sleeve 37 also tend to provide transverse heat rays, which, added to the effect of the heating element, efficiently heat the current of air passing upwardly through the sleeve 37.

Should it be necessary to replace the heating unit, comprising the sleeve 37 and the heating element or wire 44 supported thereon, the casing 11 is removed from its telescopic relation with the bottom 12, the leads 17 and 18 disconnected from the posts 46 and 47, and the sleeve 37 detached from the plate 33 by the removal of the bolts 36. A new or repaired unit may then be inserted by a reversal of this operation.

While I have shown and described a preferred form of my invention, it is to be understood that the same is not to be limited in all of its details, but is capable of modification and variation which will lie within the spirit of the invention and scope of the appended claims.

What I claim is:

1. In an electrical heater, a casing, means therein including a sleeve and cooperating baffle carried on the exterior of the latter for enabling upward air flow through said casing in separate streams, one through said sleeve and the axis of the device and the other around said sleeve, and heating means heating the inner stream and disposed in the path thereof.

2. An electrical heater comprising a hollow casing having openings in the bottom and top thereof, a member interposed between the ends of said casing to form an inner restricted vertical passageway for air passing through said casing, baffling means carried by said member and supported by said casing to insure the passage of a substantial quantity of air through said member, and heating means associated with said member and disposed in the path of air flowing through said member and acting on all air passing therethrough.

3. An electrical heater comprising a hollow casing having openings in the bottom and top thereof to permit the vertical passage of air therethrough, a sleeve-like member within said casing, means carried by said member and supported by said casing to insure the upward passage of a substantial quantity of air through said member and of a limited quantity outside the same, and heating means suspended in the path of and acting on all of the air passing through said member.

4. An electrical heater comprising a hollow casing having openings in the bottom and top thereof permitting the vertical passage of air therethrough, a vertically disposed sleeve-like member suspended within said casing, a ring-like plate surrounding said member and spaced from the inner periphery of the casing, and heating means within said member in the path of the air passing through said member.

5. In an electrical heater, a heating unit comprising a sleeve having a series of studs extending inwardly from the inner surface thereof, and a length of resistance wire suspended upon said studs and disposed in the path of air flowing through said sleeve substantially throughout the length of said wire.

6. In an electrical heater, a heating unit comprising a sleeve having a reflecting inner surface and a series of studs extending inwardly from said inner surface, and a length of coiled resistance wire suspended from said studs and insulated from said sleeve with its coils disposed in the path of air flowing through said sleeve.

7. In an electrical heater, a heating unit comprising a sleeve having a series of studs extending inwardly from the inner surface thereof at both the top and bottom thereof, insulation pieces secured to said studs, and a heating element suspended from said insulation pieces and alternately engaging top and bottom pieces and disposed in the path of air flowing through said sleeve substantially throughout the length of said element.

8. An electrical heater comprising a casing including a tubular casing member and a cooperating bottom casing member disposed below said casing member and providing a bottom inlet, and a heating unit enclosed in said casing and suspended therein above said inlet having radial supports on the casing and having apertures between said supports communicating with said bottom inlet.

9. An electrical heater comprising a casing including a tubular casing member and a cooperating bottom casing member disposed below said casing member and providing a bottom inlet, and a heating unit enclosed in said casing and suspended therein above said inlet having radial supports on the casing and having apertures between said supports communicating with said bottom inlet, said unit also including an axial sleeve communicating with said inlet and heating means inside said sleeve.

10. An electric heater comprising a hollow casing member, a heating unit adapted to heat air passing through said casing member including a sleeve surrounding the air to be heated and heating means within said sleeve heating the air passing through the latter, and a bottom casing member cooperating with said hollow casing member and forming a base and having a bottom air inlet for said sleeve and terminal connections for the heating means.

11. An electric heater comprising a casing adapted to permit the passage of air therethrough from bottom to top, a heating unit therein including a vertical sleeve having heating means extending into the path of air passing therethrough, and a lateral flange supporting said sleeve and peripherally supported by said casing at a point above the bottom inlet thereof.

12. An electric heater comprising a casing adapted to permit the passage of air therethrough from bottom to top, a heating unit therein including a vertical sleeve having heating means extending into the path of air passing therethrough, and a lateral flange supporting said sleeve and peripherally supported by said casing at a point above the bottom inlet thereof, said lateral flange having peripheral passage means and peripheral attachment means between said passage means.

13. An electric heater comprising a casing adapted to permit the passage of air therethrough from bottom to top, a heating unit therein including a vertical sleeve having heating means extending into the path of air passing therethrough, and a lateral flange supporting said sleeve and peripherally supported by said casing at a point above the bottom inlet thereof, said lateral flange being connected to the base of said sleeve and having peripheral passage means between the same and the casing and peripheral attachment means to the casing disposed between said passage means.

14. An electric heater comprising a casing adapted to permit the passage of air therethrough from bottom to top, a heating unit therein adapted to heat air passing therethrough including a sleeve surrounding the air to be heated and a laterally extending plate supporting said sleeve, and peripherally attached to said casing, and means whereby said unit may be removed bodily from said casing including separable sections in said casing and releasable connections between said sleeve and plate.

15. An electric heater comprising a casing adapted to permit the passage of air therethrough from bottom to top, a heating unit therein adapted to heat air passing therethrough including a sleeve surrounding the air to be heated and a laterally extending plate supporting said sleeve axially within said casing providing an inner air passage leading to said sleeve and outer air passages adjacent the inner periphery of said casing, and means whereby said unit may be removed bodily from said casing including separable sections in said casing telescopically connected to permit access to said sleeve and releasable connections between said sleeve and said plate.

16. An electric heater comprising a casing adapted to permit passage of air therethrough from bottom to top, a lateral flange peripherally attached to the interior thereof above the bottom inlet and having peripheral apertures and a central aperture, a vertical sleeve in the central aperture, a plurality of inwardly projecting conductor insulating studs on the inside of said sleeve and at top and bottom thereof, and a heating conductor strung between said studs.

In testimony whereof I affix my signature.

FRANK E. WOLCOTT.